(12) United States Patent
Zhao et al.

(10) Patent No.: US 11,521,653 B2
(45) Date of Patent: Dec. 6, 2022

(54) VIDEO SEQUENCE LAYOUT METHOD, ELECTRONIC DEVICE AND STORAGE MEDIUM

(71) Applicant: Beijing Baidu Netcom Science Technology Co., Ltd., Beijing (CN)

(72) Inventors: Yafei Zhao, Beijing (CN); Shichang Zhang, Beijing (CN); Ziyuan Guo, Beijing (CN); Chao Chen, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/541,822

(22) Filed: Dec. 3, 2021

(65) Prior Publication Data

US 2022/0093133 A1    Mar. 24, 2022

(30) Foreign Application Priority Data

Dec. 22, 2020  (CN) .......................... 202011529093.9

(51) Int. Cl.
| | | |
|---|---|---|
| *G11B 27/031* | (2006.01) | |
| *G06V 20/40* | (2022.01) | |
| *G11B 27/00* | (2006.01) | |

(52) U.S. Cl.
CPC ............ *G11B 27/031* (2013.01); *G06V 20/46* (2022.01); *G11B 27/005* (2013.01)

(58) Field of Classification Search
CPC ..... G11B 27/031; G11B 27/005; G06V 20/46
See application file for complete search history.

(56) References Cited

U.S. PATENT DOCUMENTS

| | | |
|---|---|---|
| 5,734,788 A | 3/1998 | Nonomura et al. |
| 6,201,928 B1 | 3/2001 | Nonomura et al. |
| (Continued) | | |

FOREIGN PATENT DOCUMENTS

| | | |
|---|---|---|
| CN | 1164925 A | 11/1997 |
| CN | 1438635 A | 8/2003 |
| (Continued) | | |

OTHER PUBLICATIONS

Extended European Search Report dated May 25, 2022, issued in connection with corresponding European Patent Application No. 21210734.6.

(Continued)

*Primary Examiner* — Thai Q Tran
*Assistant Examiner* — Jose M Mesa
(74) *Attorney, Agent, or Firm* — Akerman LLP

(57) ABSTRACT

A video sequence layout method, electronic device and storage medium are provided, and relate to fields of deep learning, virtual reality, cloud computing, video layout processing and the like. The method includes: acquiring a first video sequence, the first video sequence including a main sequence for describing a first posture of a human body and a subordinate sequence for describing a plurality of second postures of the human body; extracting the main sequence and the subordinate sequence from the first video sequence; and in a case that it is detected that a sequencing identification frame exists in the first video sequence, performing random mixed sequencing processing on video frames in the main sequence and the subordinate sequence based on the sequencing identification frame and taking a sequence combination obtained by the random mixed sequencing processing as a second video sequence.

20 Claims, 9 Drawing Sheets

(56) References Cited

U.S. PATENT DOCUMENTS

| | | | |
|---|---|---|---|
| 6,229,952 B1 | 5/2001 | Nonomura et al. | |
| 6,356,703 B1 | 3/2002 | Nonomura et al. | |
| 2002/0061186 A1 | 5/2002 | Nonomura et al. | |
| 2011/0235998 A1* | 9/2011 | Pond | G11B 27/034 386/E5.028 |
| 2020/0134875 A1* | 4/2020 | Yi | G06K 9/6215 |
| 2021/0084239 A1* | 3/2021 | Pinskaya | H04N 5/2622 |

FOREIGN PATENT DOCUMENTS

| | | | |
|---|---|---|---|
| CN | 110245638 A | 9/2019 | |
| CN | 112102449 A | 12/2020 | |
| DE | 69601571 T2 | 7/1999 | |
| EP | 0788104 A1 | 8/1997 | |
| JP | 2002208260 A | 7/2002 | |
| KR | 100302480 B1 | 11/2001 | |
| MY | 120348 A | 10/2005 | |
| TW | 331630 B | 5/1998 | |
| WO | 97/07509 A1 | 2/1997 | |
| WO | 2018/170487 A1 | 9/2018 | |

OTHER PUBLICATIONS

Notice of Reasons for Refusal dated Oct. 4, 2022, issued in connection with corresponding Japanese Patent Application No. 2021-115562.

* cited by examiner

VIDEO SEQUENCE LAYOUT METHOD, ELECTRONIC DEVICE AND STORAGE MEDIUM

CROSS-REFERENCE TO RELATED APPLICATION

This application claims priority to Chinese patent application No. 202011529093.9 filed on Dec. 22, 2020, which is hereby incorporated by reference in its entirety.

TECHNICAL FIELD

The present disclosure relates to the field of information processing. The present disclosure relates particularly to the fields of deep learning, virtual reality, cloud computing, video layout processing, and the like.

BACKGROUND

With the development of computer technology, technologies such as artificial intelligence, deep learning, virtual reality, cloud computing and so on are widely used in the life of users, playing an interactive role with users in various application scenarios such as live broadcasts, short videos, online trainings and the like. In these scenarios, a virtual character (2D or 3D) can be used for replacing a real character or the virtual character can be used for cooperating with a real character together to record videos.

Electronic devices like portable devices and mobile phone terminals etc. are more intelligent than before, and the parsing capabilities of chips are stronger, especially video information parsing, picture rendering, and the like are faster and clearer than before, so that users' requirement on video information is increasingly improved. Whether the recorded videos are diversified will directly influence the interactive experience of the users, and the diversification of the recorded videos can also enrich the video content.

SUMMARY

The present disclosure provides a video sequence layout method, a video sequence layout apparatus, an electronic device and a storage medium.

According to an aspect of the present disclosure, a video sequence layout method is provided, including:

acquiring a first video sequence, the first video sequence including a main sequence for describing a first posture of a human body and a subordinate sequence for describing a plurality of second postures of the human body;

extracting the main sequence and the subordinate sequence from the first video sequence; and in a case that it is detected that a sequencing identification frame exists in the first video sequence, performing random mixed sequencing processing on video frames in the main sequence and the subordinate sequence based on the sequencing identification frame and taking a sequence combination obtained by the random mixed sequencing processing as a second video sequence;

wherein the sequencing identification frame includes at least one of a reverse frame, a jump frame, or a transition frame.

According to another aspect of the present disclosure, a video sequence layout apparatus is provided, including:

a video acquisition module configured for acquiring a first video sequence, the first video sequence including a main sequence for describing a first posture of a human body and a subordinate sequence for describing a plurality of second postures of the human body;

a video extraction module configured for extracting the main sequence and the subordinate sequence from the first video sequence; and a video layout module configured for, in a case that it is detected that a sequencing identification frame exists in the first video sequence, performing random mixed sequencing processing on video frames in the main sequence and the subordinate sequence based on the sequencing identification frame and taking a sequence combination obtained by the random mixed sequencing processing as a second video sequence;

wherein the sequencing identification frame includes at least one of a reverse frame, a jump frame, or a transition frame.

According to another aspect of the present disclosure, an electronic device is provided, including:

at least one processor; and a memory communicatively connected to the at least one processor; wherein, the memory stores instructions executable by the at least one processor, and the instructions are executed by the at least one processor to enable the at least one processor to execute the method provided by any embodiment of the present disclosure.

According to another aspect of the present disclosure, a non-transitory computer-readable storage medium storing computer instructions is provided, wherein the computer instructions are configured for causing a computer to execute the method provided by any embodiment of the present disclosure.

According to another aspect of the present disclosure, a computer program product is provided, wherein the computer program product includes computer instructions, and the computer instructions, when executed by a processor, implement the method provided by any embodiment of the present disclosure.

It should be understood that the content described in this section is not intended to identify the key or important features of the embodiments of the present disclosure, and is not intended to limit the scope of the present disclosure. Other features of the present disclosure will be easily understood through the following description.

BRIEF DESCRIPTION OF THE DRAWINGS

The accompanying drawings are used to better understand technical solution(s) of the present disclosure and should not be constructed a limitation to the present disclosure. Wherein.

DETAILED DESCRIPTION

The exemplary embodiments of the present disclosure will be described below in combination with the accompanying drawings, including various details of the embodiments of the present disclosure to facilitate understanding, which should be considered as exemplary only. Therefore, those skilled in the art should realize that various changes and modifications can be made to the embodiments described herein without departing from the scope and spirit of the present disclosure. Likewise, descriptions of well-known functions and structures are omitted in the following description for clarity and conciseness.

The term "and/or" as used herein, is merely an association relationship that describes an associated object, and means that there can be three relationships. For example, A and/or B can represent three cases of A existing alone, A and B existing simultaneously, and B existing alone. The term "at least one," as used herein, means any one of the plurality or any combination of at least two of the plurality, e.g., including at least one of A, B, or C, that can represent including any one or more elements selected from the group consisting of A, B, and C. The terms "first" and "second," as used herein, mean a plurality of similar technical terms and are used to distinguish among the plurality of similar technical terms, and are not meant to limit the order or to limit only two. For example, a first feature and a second feature mean two types of features/two features, wherein the first feature can be one or more, and the second feature can also be one or more.

Further, in the following specific implementations, numerous specific details are set forth in order to better describe the present disclosure. It will be understood by those skilled in the art that the present disclosure can be implemented without some of the specific details. In some instances, methods, means, elements and circuits well known to those skilled in the art will not be described in detail so as to highlight the subject matter(s) of the present disclosure.

In various application scenarios such as live broadcast, short video, online training and the like, taking a scenario in which a virtual character (2D or 3D) is used for replacing a real character or the virtual character is used for cooperating with a real character together to record videos as an example, the virtual character can be generated by using techniques such as deep learning and the like. For example, by inputting a voice into a deep learning model, a face area of the virtual character can be generated and the action (including a mouth-shape action, an expression action and the like) of the face area of the virtual character is consistent with the voice in rhythm, semantic content and the like, so that a video picture of the virtual character telling the voice content is obtained. In the video picture, actions of the body parts other than the face come from a previously recorded background video.

Figure 1:
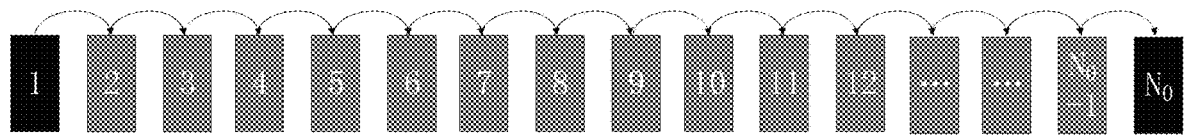
FIG. 1 is a schematic diagram of unidirectional playing of a background video sequence for generating a virtual character in the related art.
Figure 2:
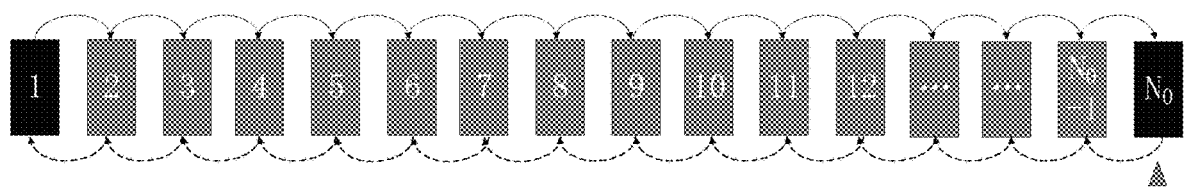
FIG. 2 is a schematic diagram of bidirectional cyclic playing of a background video sequence for generating a virtual character in the related art.

FIG. 1 is a schematic diagram of unidirectional playing of a background video sequence used for generating a virtual character in the related art. As shown in FIG. 1, a plurality of video frames in the background video sequence are in a unidirectional playing state, i.e. forward playing, so as to record the background video. FIG. 2 is a schematic diagram of bidirectional cyclic playing of a background video sequence used for generating a virtual character in the related art. As shown in FIG. 2, a plurality of video frames in the background video sequence can be forward played, or can also be reversely played based on a frame "$N_0$" identified by a triangle in FIG. 2, to realize bidirectional cyclic playing so as to record the background video. Wherein, FIGS. 1-2 present video pictures of the video at the 0th, 1st, 2nd, 3rd, 4th, and 5th seconds, respectively.

The length and content of the background video are difficult to be changed after the recording is finished, and in a case that the background video is applied to the above process of generating the virtual character, the length of the video pictures of obtained virtual character is limited and the content thereof is solitary.

Adopting the present disclosure, the random mixed sequencing processing can be performing on video frames extracted from initial video frames (video frames composed of a main sequence and/or a subordinate sequence) based on a sequencing identification frame (at least one identification frame among a reverse frame, a jump frame and a transition frame), and a sequence combination obtained by the random mixed sequencing processing is used as a new video sequence; wherein the length of the new video sequence can be adjusted based on user requirements in the process of the random mixed sequencing processing, and the length is not limited; the content of the new video sequence is provided with more randomness and presents diversification.

Figure 3:
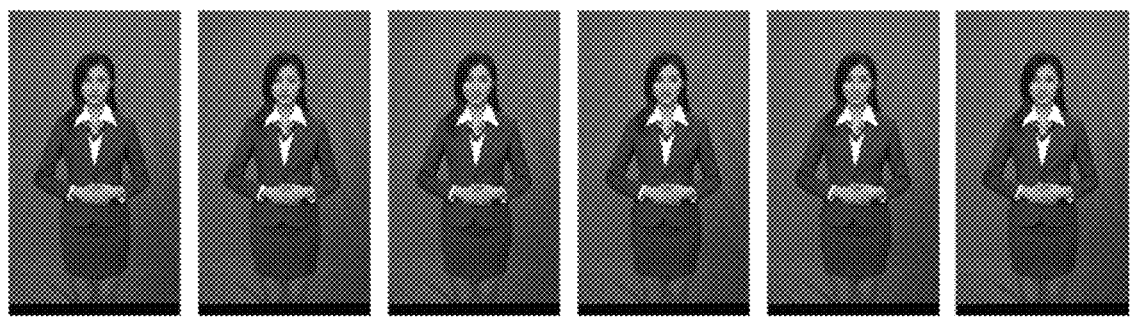
FIG. 3 is a schematic diagram of a main sequence of an embodiment of the present disclosure.

The technical terms to which this disclosure relates are described as follows:

1) Main action sequence (abbreviated as main sequence): it is an action video sequence for a virtual character in an idle state. FIG. 3 is a schematic diagram of a main sequence of an embodiment of the present disclosure. As shown in FIG. 3, the virtual character remains substantially the same posture throughout the main action sequence with only a slight action.

Figure 4:
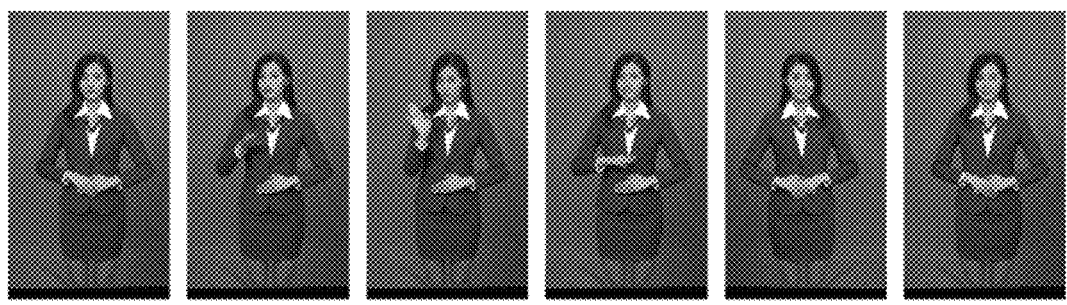
FIG. 4 is a schematic diagram of a subordinate sequence of an embodiment of the present disclosure.

2) Subordinate action sequence (abbreviated as subordinate sequence): it is a sequence matched with the main sequence. FIG. 4 is a schematic diagram of a subordinate sequence according to an embodiment of the present disclosure. As shown in FIG. 4, in this type of subordinate sequences, a virtual character begins with a posture in the main action sequence, makes a significant action (such as hand waving, left and right hands stretching, etc.), and then puts the hand back to the original position, which returns to the posture of the main sequence.

3) Reverse frame: a frame "$N_0$" identified by the triangle shown in FIG. 2 is taken as a reverse frame such that the reverse playing can be performed. Of course, the forward playing can be performed at this frame, which only means that the frame as a reverse frame has the ability to reversely play.

4) Jump frame: the jump frame can be any frame of the main sequence, or a starting frame (the first frame) and an ending frame (the last frame) of the subordinate sequence, and the jump frame is configured for realizing jump playing between different action sequences.

5) Transition Frame: the transition frame is an interpolated frame generated between jump frames of two different sequences through an interpolation algorithm or a neural network model.

Figure 5:
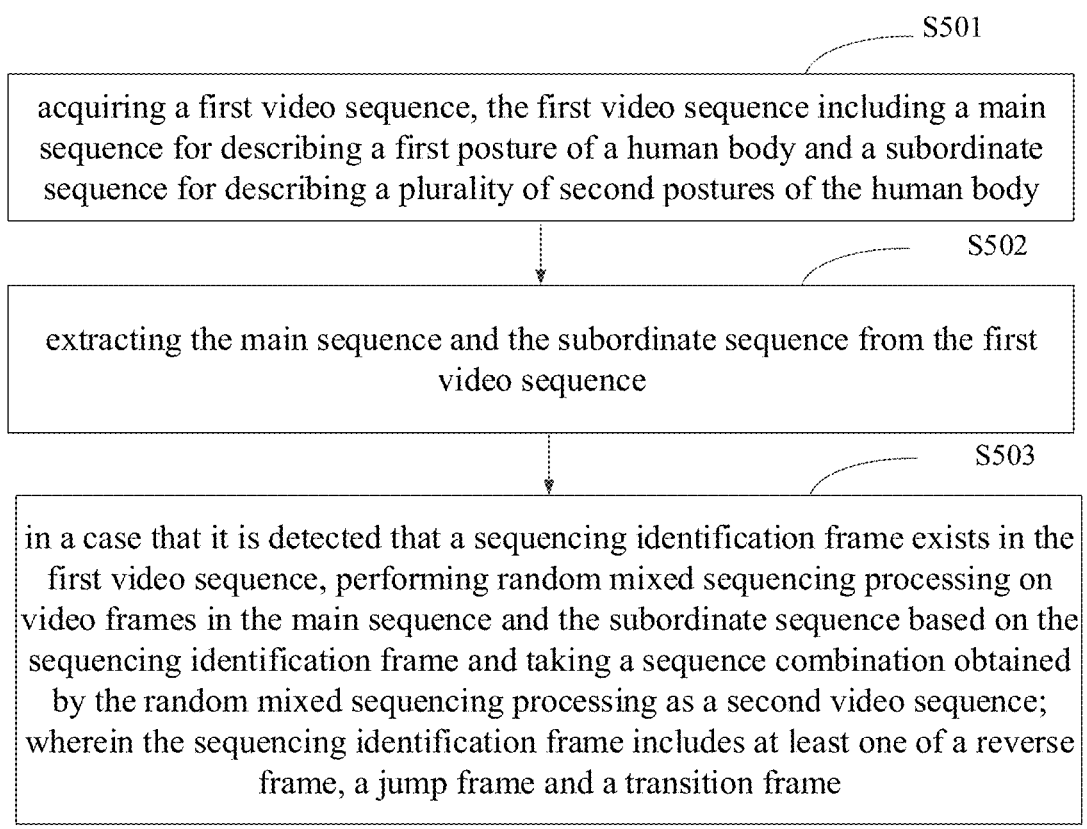
FIG. 5 is a schematic flow diagram of a video sequence layout method according to an embodiment of the present disclosure.

According to an embodiment of the present disclosure, a video sequence layout method is provided. FIG. 5 is a schematic flow diagram of a video sequence layout method according to an embodiment of the present disclosure, which can be applied to a video sequence layout apparatus. For example, in a case that the apparatus can be deployed to be executed by a terminal or a server or other processing devices, the apparatus can perform video frame extraction, random mixed sequencing of video frames, and the like. Wherein, the terminal can be user equipment (UE), a mobile device, a cellular phone, a cordless phone, a personal digital assistant (PDA), a handheld device, a computing device, a vehicle-mounted device, a wearable device, etc. In some possible implementations, the method can also be implemented by the manner of the processor calling computer-readable instructions stored in the memory. As shown in FIG. 5, the method includes:

S501, acquiring a first video sequence, the first video sequence including a main sequence for describing a first posture of a human body and a subordinate sequence for describing a plurality of second postures of the human body;

S502, extracting the main sequence and the subordinate sequence from the first video sequence; and S503, in a case that it is detected that a sequencing identification frame exists in the first video sequence, performing random mixed sequencing processing on video frames in the main sequence and the subordinate sequence based on the sequencing identification frame and taking a sequence combination obtained by the random mixed sequencing processing as a second video sequence. Wherein the sequencing identification frame includes at least one of a reverse frame, a jump frame, or a transition frame.

In an example based on S501-S503, random mixed sequencing processing can be added for a main action sequence (abbreviated as a main sequence) and a subordinate action sequence (abbreviated as a subordinate sequence) constituting a first video sequence, so that the random mixed sequencing processing can be performed on video frames in the main sequence and the subordinate sequence based on an sequencing identification frame (a reverse frame, a jump frame, a transition frame, etc.), that is, switching the playing order of the video frames or switching between a plurality of sequences (such as switching between at least two main sequences, switching between at least two main and subordinate sequences, etc.), and the sequence combination obtained by the random mixed sequencing processing is taken as a second video sequence. Because the length of the second video sequence and the layout of the video frames can be generated on the basis of the first video sequence with any short duration, adopting the present example, a plurality of sequence combinations of video sequences with any duration and any playing order can be obtained, that is, the second video sequence is not limited to a fixed length of the first video sequence, such as the first video sequence with a playing duration of 30 minutes. A second video sequence with a playing duration of 60 minutes or more can be generated based on requirements. The second video sequence is not limited to a forward playing order or a reverse playing order of the first video sequence, jumping or transition can be performed between respective sequences (the main sequence and the subordinate sequence) of or video frames of a certain sequence of the first video sequence, and more second video sequences with random mixed sequencing of video frames can be generated based on requirements, increasing randomness of video frame layout.

Adopting the present disclosure, a first video sequence can be acquired, wherein the first video sequence includes a main sequence for describing a first posture of a human body and a subordinate sequence for describing a plurality of second postures of the human body. The main sequence and the subordinate sequence are extracted from the first video sequence, and in a case that it is detected that a sequencing identification frame exists in the first video sequence, random mixed sequencing processing can be performed on video frames in the main sequence and the subordinate sequence based on the sequencing identification frame, such as performing the reverse playing on the video frames based on the reverse frame, switching from one sequence to other different sequences based on the jump frame, triggering switching to other different sequences based on the jump frame, and further switching to a specific designated frame in the sequence based on the transition frame, and then, any sequence combination obtained by random mixed sequencing processing is taken as a second video sequence, such that the randomness of the video frames can be increased, the diversification of video layout is improved, the length of the video can be laid out based on user requirements, and the length is not limited.

In the present disclosure, a first video sequence can be acquired, the first video sequence including a main sequence for describing a first posture of a human body and a subordinate sequence for describing a plurality of second postures of the human body. The main sequence and the subordinate sequence are extracted from the first video sequence, and in a case that it is detected that a sequencing identification frame exists in the first video sequence, random mixed sequencing processing is performed on video frames in the main sequence and the subordinate sequence based on the sequencing identification frame and a sequence combination obtained by the random mixed sequencing processing is taken as a second video sequence, wherein the sequencing identification frame includes at least one of a reverse frame, a jump frame, or a transition frame. Adopting the present disclosure, diversification of video layout can be improved.

The present disclosure can be applied to various application scenarios combining a limited number of video sequences into richer and more diversified video sequences, which are not limited to scenarios in which the virtual character (2D or 3D) is adopted to replace or simulate a real character, in scenarios such as live broadcasts, short videos, online trainings and the like.

Figure 6:
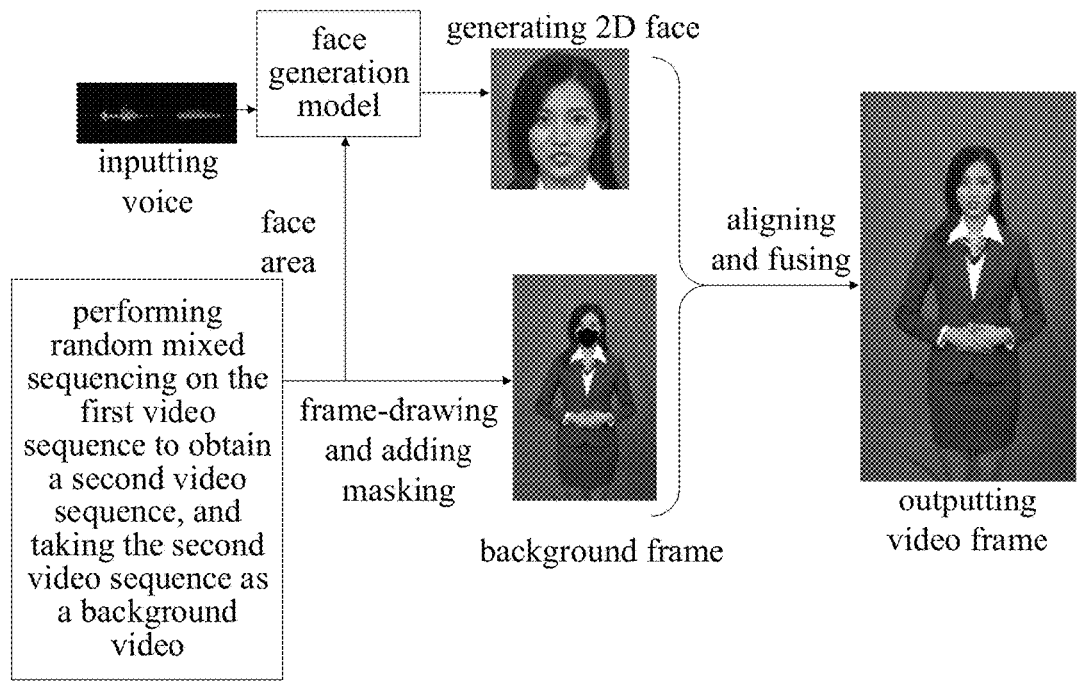
FIG. 6 is a schematic diagram of generating a 2D digital human video picture according to an embodiment of the present disclosure.

FIG. 6 is a schematic diagram of generating a 2D digital human video picture according to an embodiment of the present disclosure. Applying a second video sequence obtained by the random mixed sequencing in the present disclosure to a scenario of generating a virtual character (e.g., a 2D digital human), a face area of the 2D digital human can be obtained based on an input voice. The second video sequence is taken as a background video, and the video picture containing the 2D digital human is obtained by combining the face area of the 2D digital human with actions of other parts other than the face area in the background video, so that the authenticity of the 2D digital human is increased, and the 2D digital human is more natural and close to a real person, which specifically includes the following contents:

First, by a deep learning technique, a voice (e.g., generated by the text to speech technology (TTS)) can be input into a neural network model (e.g., a face generation model) to generate a 2D face (including the face area) that is a face picture (including a mouth shape and an expression) consistently matching the input voice in content (e.g., rhythm, semantics, etc.).

Wherein, the image of the 2D digital human can be designed in a self-defined manner (i.e. a virtual character) or can come from a real character A, and a video picture which tells the voice content with respect to the character A is generated, so that the character A in the picture can be controlled to say something that he/she himself/herself does not really say, and the consistency of the voice (rhythm, semantic content) with the face action (including a mouth-shape action and an expression action) of the face can be achieved.

If the input voice does not come from the real voice of the character A, the voice acquisition mode can include: 1) the voice generated by the text to speech technology (TTS) and close to the talking of the character A; 2) the voice of another character B; 3) other voices generated by TTS (which do not necessarily correspond to a real person, and can be a simulated animated dubbing, etc.).

Second, frames can be extracted from the existing background video in the process of matching a 2D face with other parts of the body. With respect to the background video, the above second video sequence can be read (i.e. a second video sequence obtained by the above video layout for the first video sequence and taking the same as the background video), the background video is obtained based on the second video sequence, each frame of the background video is decoded to obtain a plurality of background frames, and two paths of information are output after processing each background frame.

Wherein, the first path of information is an intercepted face area (i.e. a 2D face obtained by inputting into the face generation model); and the second path of information is a masking shielded background frame obtained after masking processing is added to the face area of each background frame. Finally, the generated 2D face and the generated masking shielded background frames are spliced into an output video frame after being aligned and fused, to be directly played and presented or compressed and encoded, and then transmitted to a network for playing. Due to the fact that by generating the second video sequence based on requirements, the unrestricted length of the video frame and the randomness of layout are increased, and the background video obtained based on the second video sequence is more random in the length and video layout, the generated 2D digital human is more natural and close to a real person, and the flexibility, the richness of actions and the controllability of the 2D digital human are also greatly improved.

The 2D digital human can be applied to various application scenarios, including, but not limited to: 1) virtual main broadcaster for news broadcasting, audio book reading and video live broadcasting; 2) a digital assistant for customer service; 3) virtual teachers for educational training; and the like.

The 2D digital human is applied to the above application scenarios after the above 2D digital human is trained completely and deployed on-line. Since the face action is generated from a voice signal through the face generation model, actions of the body parts other than the face come from a pre-recorded background video. In the whole process of a digital human presentation, each frame is gradually extracted from the background video, and then a 2D face corresponding to the input voice is generated on the basis of the frame. Therefore, the quality of the layout of the background video determines the whole image of the 2D digital human, and the authenticity and the diversity of the actions of the 2D digital human.

The length and content of the background video are generally recorded synchronously when the training materials are recorded, and are difficult to be changed after the training is completed. For digital humans needing to be presented for a long time, there is a need for a background video that can be played continuously for a long time, but it is difficult to determine how long a background video is sufficient for a particular application. Meanwhile, actions in the continuous background video can only be body actions with a small amplitude, so that serious violations of voice content with action pictures can be avoided (for example, an action of "swiping hands for bye" is taken when the product is introduced). After the video is recorded, when the video is played, in order to guarantee the time order consistency of actions in the video, the video must be played forward or reversely based on the time order, and the front-back order between the frames cannot be disordered. Therefore, the reading order (or playing order) of the 2D digital human background frames is not natural, and the mode is solitary, if adopting the unidirectional order playing as shown in FIG. 1 or the bidirectional cyclic playing as shown in FIG. 2.

Wherein, the unidirectional order playing is: performing playing based on the time axis direction in a case that the background frames are recorded, from the first frame to the last frame, and then ending. This requires that a long-time background video is recorded in a case that a long-time presentation is made. For example, a half-hour playing requires that a background video with the duration of half-hour is recorded in advance, and a half-hour playing presentation cannot be completed if the duration of the recorded background video is less than a half-hour. In addition, in the present disclosure, a second video sequence can be obtained by the video layout of the first video sequence, and the second video frame is taken as the background video. Since random mixed sequencing can be performed based on a sequencing identification frame (a reverse frame, a jump frame, a transition frames, etc.), a background video with any duration can be generated by using the short-time continuous background video, and therefore, the method is not limited by the duration.

The bidirectional cyclic playing is: playing forward from the first frame to the last frame (the frame $N_0$) in the background frames and then playing reversely back (the triangle indicates that the last frame is a reverse frame), so that the bidirectional cyclic playing constituted by the forward direction and the reverse direction can generate the background frames with any duration. However, this also requires that the durations of the background frames should be long enough to avoid the user discovering such a "moving in circles" playing mode that would enhance the user's "monotonic and unrealistic" look and feel of the generated 2D digital human. Therefore, it is necessary to implement a layout and playing mode that breaks such "moving in circles" feeling, to bring about a "random and natural" feeling. In the present disclosure, not only a background video with any duration is generated by random mixed sequencing, but also switching and layout are performed between two or more non-continuous background videos (the main sequence and/or the subordinate sequence), so as to trigger a corresponding video picture with a relatively large action amplitude at a specific moment by using a random signal.

In an implementation, the method further includes: adjusting a playing order of the video frames in the first video sequence based on the reverse frame, wherein the reverse frame includes a further video frame other than a starting frame (e.g., the first frame) in the first video sequence. Adopting the implementation, the playing order can be adjusted based on the reverse frame, and a new order combination can be obtained based on the reverse frame, so that the second video sequence with any duration is generated by using the short-time continuous first video sequence.

In an implementation, the method further includes: connecting the video frames in the first video sequence based on the jump frame and/or the transition frame; wherein in a case that the first video sequence includes the main sequence, the jump frame is any video frame in the main sequence; in a case that the first video sequence includes the subordinate sequence, jump frames are a starting frame (e.g., the first frame) and an ending frame (e.g., the last frame) of the subordinate sequence. In a case that the first video sequence includes different main sequences and/or different subordinate sequences, the transition frame is an interpolated frame obtained based on at least one jump frame switched between the different main sequences and/or the different subordinate sequences. Adopting the implementation, accurate switching between different sequences (switching between the main sequence and a further main sequence, switching between the main sequence and the subordinate sequence, switching between the subordinate sequence and the subordinate sequence, switching between the subordinate sequence and a further subordinate sequence, and the like) can be performed based on jump frames in the main sequence and subordinate sequence, and the jump frame is further combined with the transition frame, to obtain a more accurate switching effect for switching to a specific frame.

In an implementation, in the case that it is detected that the sequencing identification frame exists in the first video sequence, performing random mixed sequencing processing on video frames in the main sequence and the subordinate sequence based on the sequencing identification frame and taking the sequence combination obtained by the random mixed sequencing processing as the second video sequence, includes: performing forward playing on the video frames in the first video sequence; in response to detecting that the sequencing identification frame is the reverse frame, performing reverse playing of the video frames based on a first random signal; and taking the sequence combination obtained based on the forward playing and the reverse playing of the video frames as the second video sequence.

In an example, a main sequence and/or a subordinate sequence can be obtained as the first video sequence. Wherein, in the main sequence, all the other video frames other than the starting frame (e.g., the first frame) can be taken as reverse frames. In the subordinate sequence, all the other video frames other than the starting frame (e.g., the first frame) can also be taken as reverse frames.

The example can be applied to a scenario of a 2D digital human generation. The first video sequence (such as a video sequence composed of the main sequence and/or the subordinate sequence) can be played in a forward order beginning from the first frame in the process of performing the video sequence layout. In a case of playing to a certain frame in the middle of the first video sequence, if a first random signal (used for triggering forward playing or reverse playing) is received, in response to the first random signal which is configured for triggering the forward playing, the forward playing continues to be performed from the middle frame. In a case that the first random signal is configured for triggering the reverse playing, if the sequencing identification frame existing in the first video sequence is a reverse frame, the reverse playing is performed after playing to the reverse frame, or if the middle frame is a reverse frame, the reverse playing is performed from the middle frame. The sequence combination obtained based on the forward playing and the reverse playing of video frames is taken as the above second video sequence.

Adopting this example, by introducing the reverse frame-based random decision described above, a playing sequence with any duration can be generated by using a shorter first video sequence while the randomness of sequence order combinations is also increased to some extent. Taking the scenario of the 2D digital human generation as an example, the first video sequence is the background video, shielding is performed by adding the masking in the face area of the background video to obtain masking shielded background frames, and a generated target face (a 2D face picture obtained by inputting a voice to the neural network model, wherein a mouth shape and an expression contained in the 2D face match the input voice in the content, such as rhythm, semantics, and the like) and the masking shielded background frames are spliced into output video frames after being aligned and fused, to be directly played or transmitted to a network for playing and the like. Because the length of the background video and the video layout are more random, the generated 2D digital human is more natural.

In an implementation, in the case that it is detected that the sequencing identification frame exists in the first video sequence, the performing random mixed sequencing processing on video frames in the main sequence and the subordinate sequence based on the sequencing identification frame and taking the sequence combination obtained by the random mixed sequencing processing as the second video sequence includes: acquiring a first main sequence in the first video sequence; in response to detecting that the sequencing identification frame of the first main sequence is the jump frame, performing jump playing of the video frames in the first main sequence based on a second random signal, and switching to a further main sequence other than the first main sequence; and taking the sequence combination obtained based on the first main sequence and the further main sequence as the second video sequence.

In an example, the switching is performed between a main sequence and a main sequence. A first main sequence in the first video sequence can be read first; in a case that a certain jump frame of the first main sequence is read, a second random signal (configured for triggering jump playing to a further main sequence) is received, and in response to the second random signal, in a case that the second random signal is configured for triggering jump playing to a further main sequence, a jump is performed to the further main sequence (there can be one or more further main sequences), and the process moves in circles until a new sequence order combination is obtained based on the jump frame.

In an implementation, in a case of two main sequences, and in a case that the further main sequence is a second main sequence, the method further includes: in response to detecting that the sequencing identification frame of the second main sequence is the jump frame, performing jump playing of the video frames in the second main sequence based on a third random signal, and switching to the first main sequence. Adopting the implementation, the switching can be performed between two main sequences based on a jump frame to obtain more sequence order combinations, and the accurate switching can be realized.

In an implementation, in a case of a plurality of main sequences, and in a case that further main sequences are a plurality of main sequences, for example, including a second main sequence, a third sequence, . . . , and an i-th sequence, with i being a positive integer greater than 3, the method further includes: in response to detecting that the sequencing identification frame of the second main sequence is the jump frame, performing jump playing of the video frames in the second main sequence based on a fourth random signal, and switching to a corresponding sequence in the second main sequence, the third sequence, . . . , and the i-th sequence; and performing the jump playing in the second main sequence, the third sequence, . . . , and the i-th sequence, or switching back to the first main sequence after performing the jump playing in the second main sequence, the third sequence, . . . , and the i-th sequence. Adopting the implementation, the switching can be performed between the plurality of main sequences based on a jump frame to obtain more sequence order combinations, and the accurate switching can be realized.

In an implementation, in the case that it is detected that the sequencing identification frame exists in the first video sequence, the performing random mixed sequencing processing on video frames in the main sequence and the subordinate sequence based on the sequencing identification frame and taking the sequence combination obtained by the random mixed sequencing processing as the second video sequence includes: acquiring a first main sequence and a first subordinate sequence in the first video sequence; in response to detecting that the sequencing identification frame of the first main sequence is the jump frame, performing jump playing of the video frames in the first main sequence based on a fifth random signal, and switching to the first subordinate sequence; performing forward playing on the video frames in the first subordinate sequence until an ending frame of the first subordinate sequence; and taking the ending frame as a jump frame and switching back to the first main sequence, or taking the ending frame as a jump frame and also taking consideration of a condition that the sequencing identification frame is the transition frame, switching back to a designated frame in the first main sequence based on the transition frame after triggering the jump playing based on the jump frame.

In an example, the first main sequence in the first video sequence can be read first; in a case that a certain jump frame of the first main sequence is read, a fifth random signal (configured for triggering jump playing to the subordinate sequence) is received, and in response to the fifth random signal, in a case that the fifth random signal is configured for triggering jump playing to the subordinate sequence, a jump is performed to one or more subordinate sequences; and the process moves in circles until a new sequence order combination is obtained based on the jump frame. Wherein, in the subordinate sequence, only the first frame and the last frame can be taken as jump frames, and the playing of the subordinate sequence can be forward playing and cannot be interrupted.

In the above example, switching from the main sequence to the subordinate sequence may be performed or switching from the subordinate sequence to the main sequence may be performed, which will not be described in detail.

In an implementation, the switching is performed between the main sequence and the subordinate sequence. There are one or more first main sequences and there are one or more first subordinate sequences. The jump playing may be performed based on at least one mode of: a one-main-one-subordinate layout and playing mode of different sequences, a one-main-multi-subordinate layout and playing mode of different sequences, or a multi-main-multi-subordinate layout and playing mode of different sequences between the first main sequences and the first subordinate sequences. Adopting the implementation, switching among different sequences can be performed by adopting a plurality of layout and playing modes ("one-main-one-subordinate," "one-main-multi-subordinate" and "multi-main-multi-subordinate") and the jump frame to obtain more sequence order combinations, and the accurate switching can be realized.

Application Example

Figure 7:
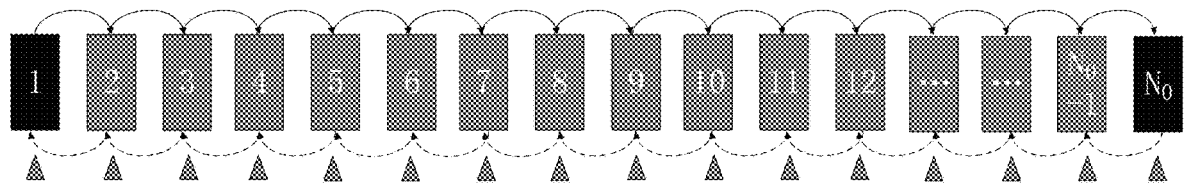
FIG. 7 is a schematic diagram of layout and playing of a background video sequence according to an embodiment of the present disclosure.

A processing flow adopting the embodiment of the present disclosure includes the following contents:

Firstly, generating the background video with any duration by using a short-time continuous background video FIG. 7 is a schematic diagram of layout and playing of a background video sequence according to an embodiment of the present disclosure. As shown in FIG. 7, for the layout and playing, more reverse frames can be added on basis of bidirectional cyclic playing as shown in FIG. 2. All the frames other than the first frame can be taken as reverse frames. In the process of a 2D digital human generation, based on the layout and playing mode as shown in FIG. 7 (i.e. each frame can be determined to be forward playing or reverse playing based on requirements or randomly), sequential playing is started from the first frame, and in the case of playing to a certain frame in the middle, such as the 10th frame, whether to continue forward playing or to begin reverse playing next can be randomly determined. By introducing the random decision, a playing sequence with any duration can be generated by using a short background video, while the randomness of sequence order combinations is also increased to some extent.

Figure 8:
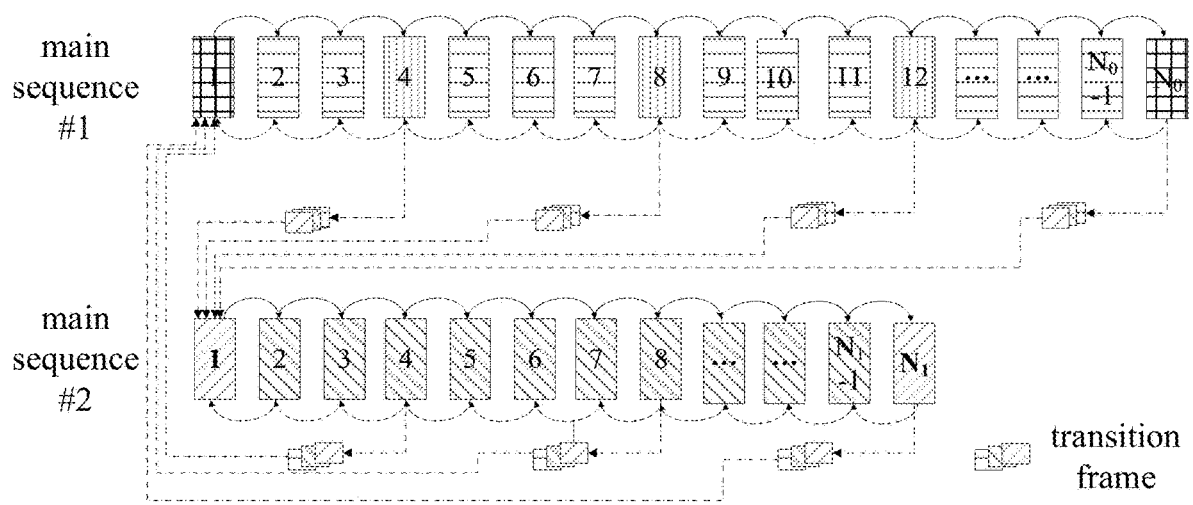
FIG. 8 is a schematic diagram of layout and playing of two background video main sequences according to an embodiment of the present disclosure.

Second, performing switching and layout between two or more non-continuous background videos 1. Layout and Playing Between Two Main Sequences FIG. 8 is a schematic diagram of layout and playing of two background video main sequences according to an embodiment of the present disclosure. As shown in FIG. 8, in order to enrich randomness of playing of a background sequence, two main sequences can be adopted, wherein each main sequence supports the layout and playing mode as shown in FIG. 7 (forward playing or reverse playing can be determined based on requirements or randomly for each frame). Apart from this, the switching between the two main sequences can be realized through the jump frame and the transition frame. Each frame of each main sequence can be taken as a jump frame, or of course a jump frame can be set every few frames (for example, every three frames in FIG. 8) based on actual application requirements, or intervals between jump frames can be customized.

The layout and playing between the two main sequences includes: 1) in a case that the 2D digital human is generated, firstly reading the main sequence #1, the reading order referring to the layout and playing as shown in FIG. 7, and in a case that a certain jump frame is read, determining whether to jump to the main sequence #2 through random triggering or external signal triggering; 2) after jumping to the main sequence #2, reading in the form of layout and playing, and then determining whether to jump to the main sequence #1 by the random triggering or external signal triggering; and 3) moving in circles in this way, which can use two main sequences to generate richer playing orders.

2. Layout and Playing Between a Plurality of Main Sequences

Figure 9:
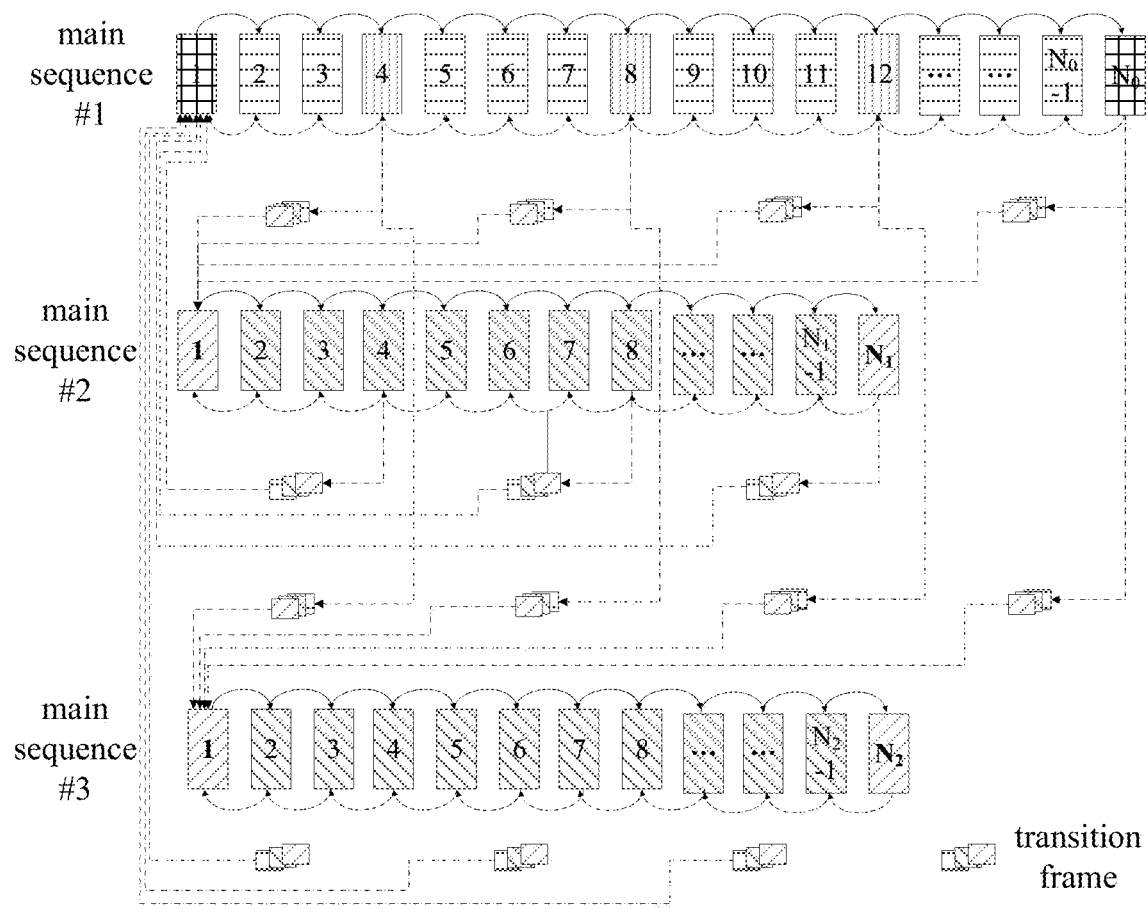
FIG. 9 is a schematic diagram of layout and playing of three background video main sequences according to an embodiment of the present disclosure.

FIG. 9 is a schematic diagram of layout and playing of three background video main sequences according to an embodiment of the present disclosure. As shown in FIG. 9, more main sequences can be at least added on the basis of the layout and playing between the two main sequences as shown in FIG. 8, to enable layout and playing among three (as shown in FIG. 9) or more main sequences.

Layout and playing among a plurality of main sequences includes: 1) in a case that a 2D digital human is generated, firstly reading the main sequence #1, the reading order referring to the layout and playing in FIG. 7, and in a case that a certain jump frame is read, determining whether to jump to the main sequence #2 or the main sequence #3 or a further main sequence through random triggering or external signal triggering; 2) if jumping to the main sequence #2, reading the main sequence #2 in the form of layout and playing, and then determining whether to jump to the main sequence #1 or the main sequence #3 or a further main sequence by the random triggering or external signal triggering; and 3) moving in circles in this way, which can use a plurality of main sequences to generate richer playing orders.

It shall be noted that: the same jump playing as described above also exists between the main sequence 2 and the main sequence 3 (as shown in FIG. 9), and the jump playing between the main sequence 2 and the main sequence 3 is not shown in FIG. 9 for the sake of brevity.

3. Layout and Playing Between "One-Main-One-Subordinate" Sequences

Each frame of the main sequence can be taken as a jump frame, while only the first frame and the last frame of the subordinate sequence can be taken as jump frames. For better switching, it can be set that the playing of the subordinate sequence can only be forward playing and cannot be interrupted.

Figure 10:
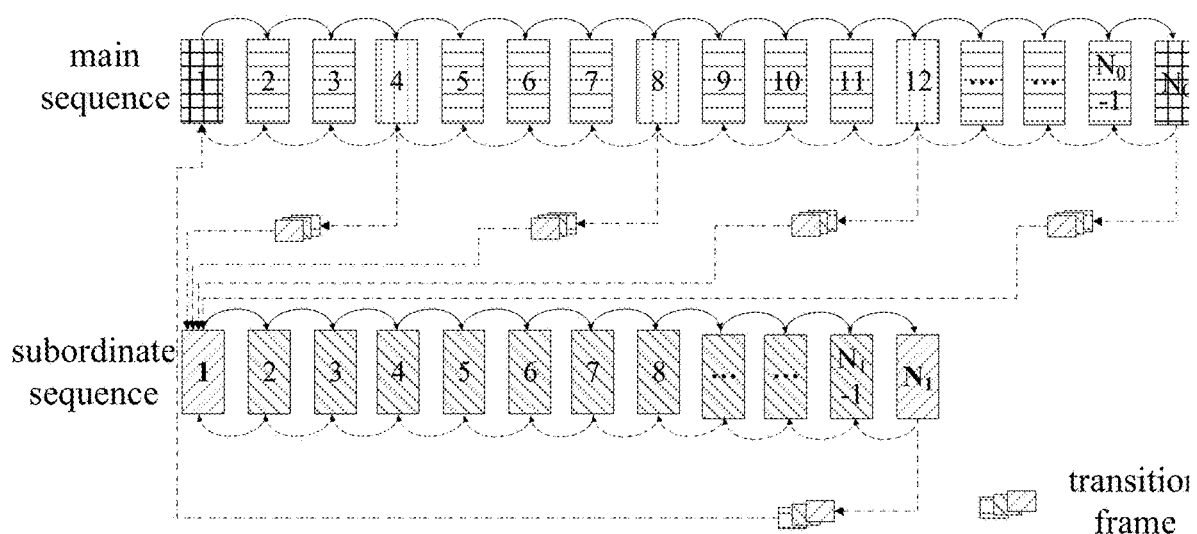
FIG. 10 is a schematic diagram of layout and playing between one-main-one-subordinate sequences according to an embodiment of the present disclosure.

FIG. 10 is a schematic diagram of layout and playing between one-main-one-subordinate sequences according to an embodiment of the present disclosure. As shown in FIG. 10, the layout and playing between one-main-one-subordinate two sequences includes: 1) in a case that a 2D digital human is generated, firstly reading the main sequence, the reading order referring to the layout and playing as shown in FIG. 7, and in a case that a certain jump frame is read, determining whether to jump to the subordinate sequence through random triggering or external signal triggering; 2) if jumping to the subordinate sequence, reading the subordinate sequence in the form of forward order playing until playing to the last frame, and then switching back to a certain jump frame of the main sequence on the basis of the transition frame; and 3) performing 1) again after returning to the main sequence, and moving in circles in this way, which can use the two sequences of "one-main-one-subordinate" to generate richer playing orders.

4. Layout and Playing Among "One-Main-Multi-Subordinate" Sequences

Figure 11:
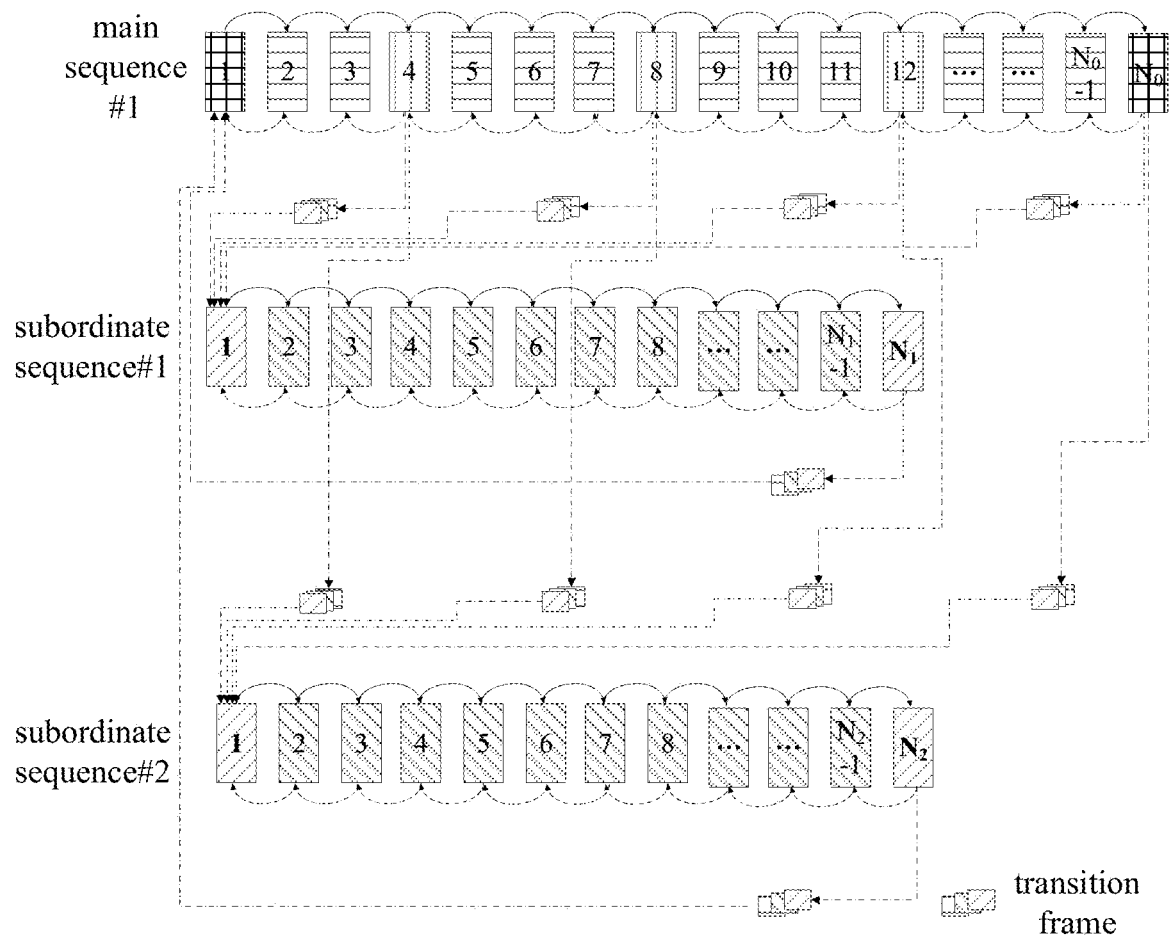
FIG. 11 is a schematic diagram of layout and playing among one-main-multi-subordinate sequences according to an embodiment of the present disclosure.

FIG. 11 is a schematic diagram of layout and playing among one-main-multi-subordinate sequences according to an embodiment of the present disclosure. As shown in FIG. 11, on basis of layout and playing of "one-main-multi-subordinate" shown in FIG. 10, more subordinate sequences can be added to complete layout and playing among "one-main-multi-subordinate" sequences. The layout and playing among two "one-main-multi-subordinate" sequences includes: 1) in a case that a 2D digital human is generated, firstly reading the main sequence, the reading order referring to layout and playing as shown in FIG. 7, and in a case that a certain jump frame is read, determining whether to jump to the subordinate sequence #1 or the subordinate sequence #2 or a further subordinate sequence through random triggering or external signal triggering; 2) if jumping to the subordinate sequence #1, reading the subordinate sequence in the form of forward order playing until playing to the last frame, and then switching back to a certain jump frame of the main sequence on the basis of the transition frame; and 3) performing 1) again after returning to the main sequence, and moving in circles in this way, which can use "one-main-multi-subordinate" mode to realize jump playing from the main sequence to more large-amplitude actions to achieve layout control of the actions.

It should be noted that: a main sequence and two subordinate sequences can be played in connection through the jump frame and the transition frame between the main sequence and the two subordinate sequences, while a jump playing cannot be performed between the two subordinate sequences.

5. Layout and Playing Among "Multi-Main-Multi-Subordinate" Sequences

The main sequence 2, the main sequence #3, etc. are added into the "one-main-multi-subordinate" sequence playing as shown in FIG. 11, which can constitute the layout and playing among the "multi-main-multi-subordinate" sequences. Switching between a main sequence and a main sequence (with reference to FIG. 8), and switching between a main sequence and a subordinate sequence (with reference to FIG. 10) can be played in connection by the jumping frame and the transition frame, which can realize richer playing orders and action layout and controls. The overall jump relationship is complex and will not be shown here.

Figure 12:
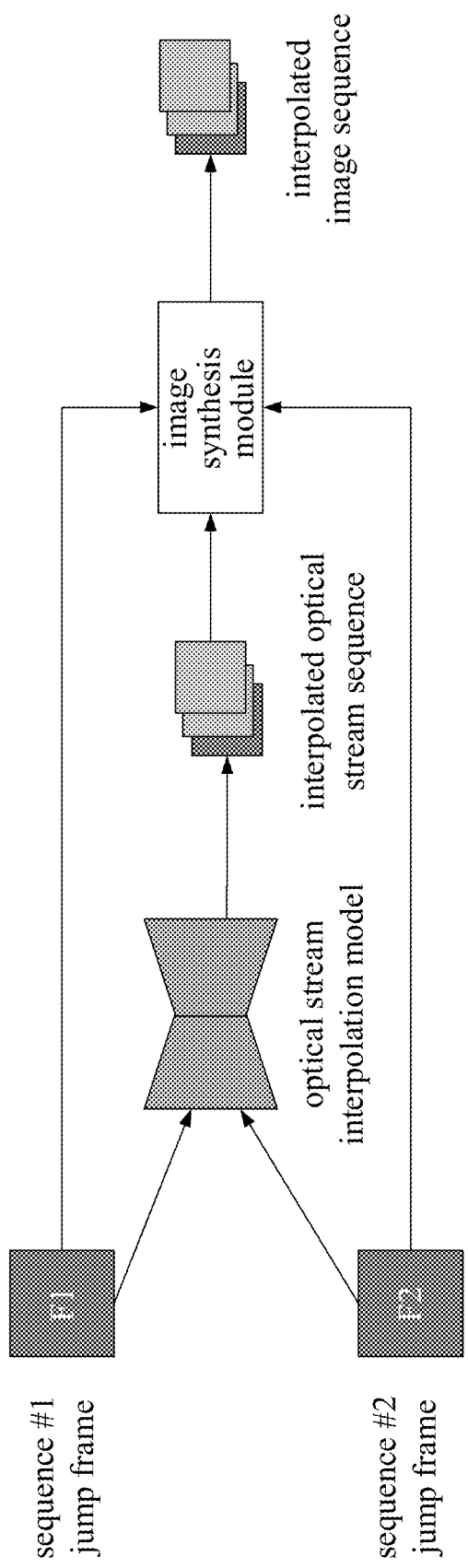
FIG. 12 is a schematic diagram of generating a transition frame according to an embodiment of the present disclosure.

Third, jumping between two discontinuous videos to generate a transition frame needed to jump between the two discontinuous videos FIG. 12 is a schematic diagram of generating a transition frame according to an embodiment of the present disclosure. The transition frame can be generated based on a trained model (optical stream interpolation model) obtained from a deep learning algorithm, as shown in FIG. 12, which includes: 1) making training data and target optical stream data by utilizing the background data or more video data in a down-sampling and frame-drawing mode, to train the optical stream interpolation model; 2) inputting two jump frames from different action sequences into the trained optical stream interpolation model, to generate an interpolated optical stream sequence; and 3) inputting two jump frames and the generated interpolated optical stream sequence together into an image synthesis module, to finally generate an interpolated image sequence (i.e. a transition frame between the two jump frames).

Figure 13:
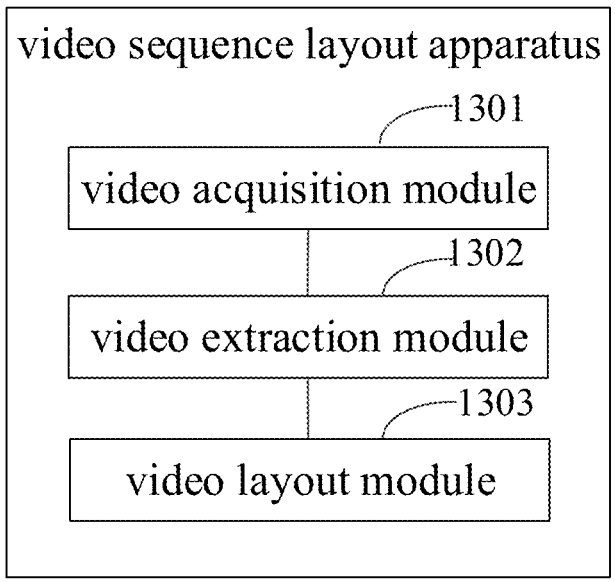
FIG. 13 is a schematic diagram of a constitution structure of a video sequence layout apparatus according to an embodiment of the present disclosure.

According to an embodiment of the present disclosure, a video sequence layout apparatus is provided. FIG. 13 is a schematic diagram of a constitution structure of a video sequence layout apparatus according to an embodiment of the present disclosure. As shown in FIG. 13, the apparatus includes: a video acquisition module 1301 configured for acquiring a first video sequence, the first video sequence including a main sequence for describing a first posture of a human body and a subordinate sequence for describing a plurality of second postures of the human body; a video extraction module 1302 configured for extracting the main sequence and the subordinate sequence from the first video sequence; and a video layout module 1303 configured for, in a case that it is detected that a sequencing identification frame exists in the first video sequence, performing random mixed sequencing processing on video frames in the main sequence and the subordinate sequence based on the sequencing identification frame and taking a sequence combination obtained by the random mixed sequencing processing as a second video sequence. Wherein the sequencing identification frame includes at least one of a reverse frame, a jump frame, or a transition frame.

In an implementation, the apparatus further includes a playing order adjustment module configured for: adjusting a playing order of the video frames in the first video sequence based on the reverse frame, wherein the reverse frame includes a further video frame other than a starting frame in the first video sequence.

In an implementation, the apparatus further includes a video frame connection module configured for: connecting the video frames in the first video sequence based on the jump frame and/or the transition frame; wherein in a case that the first video sequence includes the main sequence, the jump frame is any video frame in the main sequence; in a case that the first video sequence includes the subordinate sequence, jump frames are a starting frame and an ending frame of the subordinate sequence; and in a case that the first video sequence includes different main sequences and/or different subordinate sequences, the transition frame is an interpolated frame obtained based on at least one jump frame switched between the different main sequences and/or the different subordinate sequences.

In an implementation, the video layout module is further configured for: performing forward playing on the video frames in the first video sequence; in response to detecting that the sequencing identification frame is the reverse frame, performing reverse playing of the video frames based on a first random signal; and taking the sequence combination obtained based on the forward playing and the reverse playing of the video frames as the second video sequence.

In an implementation, the video layout module is further configured for: acquiring a first main sequence in the first video sequence; in response to detecting that the sequencing identification frame of the first main sequence is the jump frame, performing jump playing of the video frames in the first main sequence based on a second random signal, and switching to a further main sequence other than the first main sequence; and taking the sequence combination obtained based on the first main sequence and the further main sequence as the second video sequence.

In an implementation, the video layout module is further configured for: in a case that the further main sequence is a second main sequence, in response to detecting that the sequencing identification frame of the second main sequence is the jump frame, performing jump playing of the video frames in the second main sequence based on a third random signal, and switching to the first main sequence.

In an implementation, the video layout module is further configured for: in a case that further main sequences are a second main sequence, a third sequence, ..., and an i-th sequence, with i being a positive integer greater than 3, in response to detecting that the sequencing identification frame of the second main sequence is the jump frame, performing jump playing of the video frames in the second main sequence based on a fourth random signal, and switching to a corresponding sequence in the second main sequence, the third sequence, ..., and the i-th sequence; and performing the jump playing in the second main sequence, the third sequence, ..., and the i-th sequence, or switching back to the first main sequence after performing the jump playing in the second main sequence, the third sequence, ..., and the i-th sequence.

In an implementation, the video layout module is further configured for: acquiring a first main sequence and a first subordinate sequence in the first video sequence; in response to detecting that the sequencing identification frame of the first main sequence is the jump frame, performing jump playing of the video frames in the first main sequence based on a fifth random signal, and switching to the first subordinate sequence; performing forward playing on the video frames in the first subordinate sequence until the video frames are played to an ending frame of the first subordinate sequence; and taking the ending frame as a jump frame and switching back to the first main sequence, or taking the ending frame as a jump frame and also taking consideration of a condition that the sequencing identification frame is the transition frame, switching back to a designated frame in the first main sequence based on the transition frame after triggering the jump playing based on the jump frame.

In an implementation, there are one or more first main sequences and there are one or more first subordinate sequences; and the video layout module is further configured for: performing the jump playing based on at least one mode of: a one-main-one-subordinate layout and playing mode of different sequences, a one-main-multi-subordinate layout and playing mode of different sequences, or a multi-main-multi-subordinate layout and playing mode of different sequences between the first main sequences and the first subordinate sequences.

The function of each module in each apparatus of the embodiment of the present disclosure can be referred to the corresponding description in the above method, and will not be described in detail herein.

According to an embodiment of the present disclosure, the present disclosure also provides an electronic device, a readable storage medium, and a computer program product.

Figure 14:
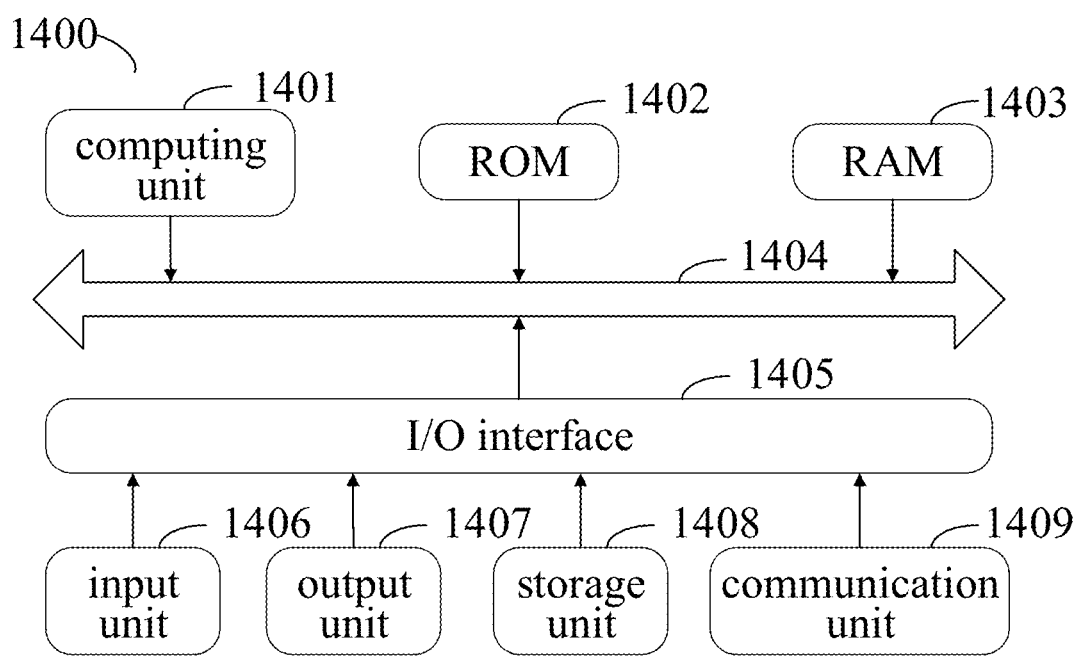
FIG. 14 is a block diagram of an electronic device configured for implementing the video sequence layout method of an embodiment of the present disclosure.

As shown in FIG. 14, FIG. 14 is a block diagram of an electronic device used to implement the video sequence layout method of an embodiment of the present disclosure. The electronic device can be the deployment device or proxy device as described above. The electronic device is intended to represent various forms of digital computers, such as laptop computers, desktop computers, workstations, personal digital assistants, servers, blade servers, mainframe computers, and other suitable computers. The electronic device can also represent various forms of mobile apparatuses, such as personal digital processing, cellular telephones, smart phones, wearable devices, and other similar computing apparatuses. The parts, connections and relations thereof, and functions thereof shown herein are merely examples and are not intended to limit the implementation of the present disclosure described and/or claimed herein.

As shown in FIG. 14, the device 1400 includes a computing unit 1401 that can perform various suitable actions and processes based on a computer program stored in a read only memory (ROM) 1402 or a computer program loaded from a storage unit 1408 into a random access memory (RAM) 1403. In the RAM 1403, various programs and data required for the operation of the device 1400 can also be stored. The computing unit 1401, the ROM 1402 and the RAM 1403 are connected to each other via a bus 1404. An input/output (I/O) interface 1405 is also connected to the bus 1404.

A plurality of components in the device 1400 are connected to the I/O interface 1405, including: an input unit 1406, such as a keyboard, a mouse, etc.; an output unit 1407, such as various types of displays, speakers, etc.; a storage unit 1408, such as a magnetic disk, an optical disk, etc.; and a communication unit 1409, such as a network card, a modem, a wireless communication transceiver, etc. The communication unit 1409 allows the device 1400 to exchange information/data with other devices over a computer network, such as the Internet, and/or various telecommunications networks.

The computing unit 1401 can be various general purpose and/or special purpose processing assemblies having processing and computing capabilities. Some examples of the computing unit 1401 include, but are not limited to, a central processing unit (CPU), a graphics processing unit (GPU), various specialized artificial intelligence (AI) computing chips, various computing units running machine learning model algorithms, a digital signal processor (DSP), and any suitable processor, controller, microcontroller, etc. The computing unit 1401 performs various methods and processes described above, such as a video sequence layout method. For example, in some embodiments, the video sequence layout method can be implemented as a computer software program tangibly embodied in a machine-readable medium, such as storage unit 1408. In some embodiments, some or all of the computer programs can be loaded into and/or installed on the device 1400 via the ROM 1402 and/or the communication unit 1409. When a computer program is loaded into the RAM 1403 and executed by the computing unit 1401, one or more of the operations of the video sequence layout method described above can be performed. Alternatively, in other embodiments, the computing unit 1401 can be configured for performing the video sequence layout method by any other suitable means (e.g., via firmware).

Various implementations of the system and technology described herein can be implemented in digital electronic circuit systems, integrated circuit systems, field programmable gate arrays (FPGAs), disclosure specific integrated circuits (ASICs), application specific standard products (ASSPs), system-on-chips (SOCs), load programmable logic devices (CPLDs), computer hardware, firmware, software, and/or combinations thereof. These various implementations can include: implementing in one or more computer programs, which can be executed and/or interpreted on a programmable system including at least one programmable processor. The programmable processor can be a dedicated or general-purpose programmable processor that can receive data and instructions from a storage system, at least one input device, and at least one output device, and transmit the data and instructions to the storage system, the at least one input device, and the at least one output device.

Program codes for implementing the methods of the present disclosure can be written in any combination of one or more programming languages. These program codes can be provided to processors or controllers of general purpose computers, special purpose computers, or other programmable data processing apparatuses, such that the program codes, when executed by the processors or the controllers, cause the functions/operations specified in the flowchart and/or block diagram to be implemented. The program codes can execute entirely on a machine, partly on a machine, partly on a machine as a stand-alone software package and partly on a remote machine or entirely on a remote machine or a server.

In the context of the present disclosure, a machine-readable medium can be a tangible medium that can contain or store a program for use by an instruction execution system, apparatus, or device or in connection with the instruction execution system, apparatus, or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device, or any suitable combination thereof. More specific examples of a machine-readable storage medium can include one or more wires-based electrical connections, a portable computer diskette, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof.

In order to provide the interaction with a user, the system and technology described herein can be implemented on a computer that has: a display apparatus (e.g., a CRT (cathode ray tube) or an LCD (liquid crystal display) monitor) for displaying information to the user; and a keyboard and a pointing apparatus (e.g., a mouse or a trackball) through which the user can provide input to the computer. Other types of apparatus can also be used to provide the interaction with a user: for example, the feedback provided to the user can be any form of sensory feedback (e.g., visual feedback, auditory feedback, or tactile feedback); and input from the user can be received in any form (including acoustic input, voice input, or tactile input).

The system and technology described herein can be implemented in a computing system (e.g., as a data server) that includes a background part, or be implemented in a computing system (e.g., an application server) that includes a middleware part, or be implemented in a computing system (e.g., a user computer having a graphical user interface or a web browser, through which a user can interact with implementations of the system and technology described herein) that includes a front-end part, or be implemented in a computing system that includes any combination of such background part, middleware part, or front-end part. The parts of the system can be interconnected by any form or medium of the digital data communication (e.g., a communication network). Examples of the communication network include: a Local Area Networks (LAN), a Wide Area Network (WAN), and the Internet.

A computer system can include a client and a server. The client and server are typically remote from each other and typically interact through a communication network. The relationship of the client and the server is generated by computer programs running on respective computers and having a client-server relationship with each other.

It should be understood that various forms of processes shown above can be used to reorder, add, or delete steps. For example, respective steps recorded in the present disclosure can be executed in parallel, or can be executed sequentially, or can be executed in a different order, so long as the desired result of the technical solution provided in the present disclosure can be achieved, no limitation is made herein.

The above specific implementations do not constitute a limitation on the protection scope of the present disclosure.

It should be understood by those skilled in the art that various modifications, combinations, sub-combinations and substitutions can be made according to design requirements and other factors. Any modification, equivalent replacement and improvement, and the like made within the spirit and principle of the present disclosure shall be included within the protection scope of the present disclosure.

What is claimed is:

1. A video sequence layout method, comprising:
acquiring a first video sequence, the first video sequence comprising a main sequence for describing a first posture of a human body and a subordinate sequence for describing a plurality of second postures of the human body;
extracting the main sequence and the subordinate sequence from the first video sequence; and
in a case that it is detected that a sequencing identification frame exists in the first video sequence, performing random mixed sequencing processing on video frames in the main sequence and the subordinate sequence based on the sequencing identification frame and taking a sequence combination obtained by the random mixed sequencing processing as a second video sequence;
wherein the sequencing identification frame comprises at least one of a reverse frame, a jump frame, or a transition frame.

2. The method of claim 1, further comprising:
adjusting a playing order of the video frames in the first video sequence based on the reverse frame, wherein the reverse frame comprises a further video frame other than a starting frame in the first video sequence.

3. The method of claim 1, further comprising:
connecting the video frames in the first video sequence based on the jump frame and/or the transition frame; wherein
in a case that the first video sequence comprises the main sequence, the jump frame is any video frame in the main sequence;
in a case that the first video sequence comprises the subordinate sequence, jump frames are a starting frame and an ending frame of the subordinate sequence; and
in a case that the first video sequence comprises different main sequences and/or different subordinate sequences, the transition frame is an interpolated frame obtained based on at least one jump frame switched between the different main sequences and/or the different subordinate sequences.

4. The method of claim 1, wherein in the case that it is detected that the sequencing identification frame exists in the first video sequence, the performing the random mixed sequencing processing on the video frames in the main sequence and the subordinate sequence based on the sequencing identification frame and taking the sequence combination obtained by the random mixed sequencing processing as the second video sequence comprises:
performing forward playing on the video frames in the first video sequence;
in response to detecting that the sequencing identification frame is the reverse frame, performing reverse playing of the video frames based on a first random signal; and
taking the sequence combination obtained based on the forward playing and the reverse playing of the video frames as the second video sequence.

5. The method of claim 1, wherein in the case that it is detected that the sequencing identification frame exists in the first video sequence, the performing the random mixed sequencing processing on the video frames in the main sequence and the subordinate sequence based on the sequencing identification frame and taking the sequence combination obtained by the random mixed sequencing processing as the second video sequence comprises:
acquiring a first main sequence in the first video sequence;
in response to detecting that the sequencing identification frame of the first main sequence is the jump frame, performing jump playing of the video frames in the first main sequence based on a second random signal, and switching to a further main sequence other than the first main sequence; and
taking the sequence combination obtained based on the first main sequence and the further main sequence as the second video sequence.

6. The method of claim 5, wherein, in a case that the further main sequence is a second main sequence, the method further comprises:
in response to detecting that the sequencing identification frame of the second main sequence is the jump frame, performing jump playing of the video frames in the second main sequence based on a third random signal, and switching to the first main sequence.

7. The method of claim 5, wherein, in a case that further main sequences are a second main sequence, a third sequence, . . . , and an i-th sequence, with i being a positive integer greater than 3, the method further comprises:
in response to detecting that the sequencing identification frame of the second main sequence is the jump frame, performing jump playing of the video frames in the second main sequence based on a fourth random signal, and switching to a corresponding sequence in the second main sequence, the third sequence, . . . , and the i-th sequence; and
performing the jump playing in the second main sequence, the third sequence, . . . , and the i-th sequence, or switching back to the first main sequence after performing the jump playing in the second main sequence, the third sequence, . . . , and the i-th sequence.

8. The method of claim 1, wherein, in the case that it is detected that the sequencing identification frame exists in the first video sequence, the performing the random mixed sequencing processing on the video frames in the main sequence and the subordinate sequence based on the sequencing identification frame and taking the sequence combination obtained by the random mixed sequencing processing as the second video sequence comprises:
acquiring a first main sequence and a first subordinate sequence in the first video sequence;
in response to detecting that the sequencing identification frame of the first main sequence is the jump frame, performing jump playing of the video frames in the first main sequence based on a fifth random signal, and switching to the first subordinate sequence;
performing forward playing on the video frames in the first subordinate sequence until an ending frame of the first subordinate sequence; and
taking the ending frame as a jump frame and switching back to the first main sequence, or taking the ending frame as a jump frame and also taking consideration of a condition that the sequencing identification frame is the transition frame, switching back to a designated frame in the first main sequence based on the transition frame after triggering the jump playing based on the jump frame.

9. The method of claim 8, wherein there are one or more first main sequences and there are one or more first subordinate sequences; and the method further comprises:
performing the jump playing based on at least one mode of: a one-main-one-subordinate layout and playing mode of different sequences, a one-main-multi-subordinate layout and playing mode of different sequences, or a multi-main-multi-subordinate layout and playing mode of different sequences between the first main sequences and the first subordinate sequences.

10. An electronic device, comprising:
at least one processor; and
a memory communicatively connected to the at least one processor; wherein,
the memory stores instructions executable by the at least one processor, and the instructions are executed by the at least one processor to enable the at least one processor to perform operations of:
acquiring a first video sequence, the first video sequence comprising a main sequence for describing a first posture of a human body and a subordinate sequence for describing a plurality of second postures of the human body;
extracting the main sequence and the subordinate sequence from the first video sequence; and
in a case that it is detected that a sequencing identification frame exists in the first video sequence, performing random mixed sequencing processing on video frames in the main sequence and the subordinate sequence based on the sequencing identification frame and taking a sequence combination obtained by the random mixed sequencing processing as a second video sequence;
wherein the sequencing identification frame comprises at least one of a reverse frame, a jump frame, or a transition frame.

11. The electronic device of claim 10, wherein the instructions are executed by the at least one processor to enable the at least one processor to further perform an operation of:
adjusting a playing order of the video frames in the first video sequence based on the reverse frame, wherein the reverse frame comprises a further video frame other than a starting frame in the first video sequence.

12. The electronic device of claim 10, wherein the instructions are executed by the at least one processor to enable the at least one processor to further perform an operation of:
connecting the video frames in the first video sequence based on the jump frame and/or the transition frame; wherein
in a case that the first video sequence comprises the main sequence, the jump frame is any video frame in the main sequence;
in a case that the first video sequence comprises the subordinate sequence, jump frames are a starting frame and an ending frame of the subordinate sequence; and
in a case that the first video sequence comprises different main sequences and/or different subordinate sequences, the transition frame is an interpolated frame obtained based on at least one jump frame switched between the different main sequences and/or the different subordinate sequences.

13. The electronic device of claim 10, wherein, when the instructions are executed by the at least one processor to enable the at least one processor to perform the random mixed sequencing processing on the video frames in the main sequence and the subordinate sequence based on the sequencing identification frame and taking the sequence combination obtained by the random mixed sequencing processing as the second video sequence, in the case that it is detected that the sequencing identification frame exists in the first video sequence, the instructions are executed by the at least one processor to enable the at least one processor to specifically perform operations of:
performing forward playing on the video frames in the first video sequence;
in response to detecting that the sequencing identification frame is the reverse frame, performing reverse playing of the video frames based on a first random signal; and
taking the sequence combination obtained based on the forward playing and the reverse playing of the video frames as the second video sequence.

14. The electronic device of claim 10, wherein, when the instructions are executed by the at least one processor to enable the at least one processor to performing the random mixed sequencing processing on the video frames in the main sequence and the subordinate sequence based on the sequencing identification frame and taking the sequence combination obtained by the random mixed sequencing processing as the second video sequence, in the case that it is detected that the sequencing identification frame exists in the first video sequence, the instructions are executed by the at least one processor to enable the at least one processor to specifically perform operations of:
acquiring a first main sequence in the first video sequence;
in response to detecting that the sequencing identification frame of the first main sequence is the jump frame, performing jump playing of the video frames in the first main sequence based on a second random signal, and switching to a further main sequence other than the first main sequence; and
taking the sequence combination obtained based on the first main sequence and the further main sequence as the second video sequence.

15. The electronic device of claim 14, wherein, in a case that the further main sequence is a second main sequence, the instructions are executed by the at least one processor to enable the at least one processor to further perform an operation of:
in response to detecting that the sequencing identification frame of the second main sequence is the jump frame, performing jump playing of the video frames in the second main sequence based on a third random signal, and switching to the first main sequence.

16. The electronic device of claim 14, wherein, in a case that further main sequences are a second main sequence, a third sequence, . . . , and an i-th sequence, with i being a positive integer greater than 3, the instructions are executed by the at least one processor to enable the at least one processor to further perform operations of:
in response to detecting that the sequencing identification frame of the second main sequence is the jump frame, performing jump playing of the video frames in the second main sequence based on a fourth random signal, and switching to a corresponding sequence in the second main sequence, the third sequence, . . . , and the i-th sequence; and
performing the jump playing in the second main sequence, the third sequence, . . . , and the i-th sequence, or switching back to the first main sequence after performing the jump playing in the second main sequence, the third sequence, . . . , and the i-th sequence.

17. The electronic device of claim 10, wherein, when the instructions are executed by the at least one processor to enable the at least one processor to perform the random mixed sequencing processing on the video frames in the main sequence and the subordinate sequence based on the sequencing identification frame and taking the sequence combination obtained by the random mixed sequencing processing as the second video sequence, in the case that it is detected that the sequencing identification frame exists in the first video sequence, the instructions are executed by the at least one processor to enable the at least one processor to specifically perform operations of:

acquiring a first main sequence and a first subordinate sequence in the first video sequence;

in response to detecting that the sequencing identification frame of the first main sequence is the jump frame, performing jump playing of the video frames in the first main sequence based on a fifth random signal, and switching to the first subordinate sequence;

performing forward playing on the video frames in the first subordinate sequence until an ending frame of the first subordinate sequence; and taking the ending frame as a jump frame and switching back to the first main sequence, or taking the ending frame as a jump frame and also taking consideration of a condition that the sequencing identification frame is the transition frame, switching back to a designated frame in the first main sequence based on the transition frame after triggering the jump playing based on the jump frame.

18. The electronic device of claim 17, wherein there are one or more first main sequences and there are one or more first subordinate sequences; and the instructions are executed by the at least one processor to enable the at least one processor to further perform an operation of:

performing the jump playing based on at least one mode of: a one-main-one-subordinate layout and playing mode of different sequences, a one-main-multi-subordinate layout and playing mode of different sequences, or a multi-main-multi-subordinate layout and playing mode of different sequences between the first main sequences and the first subordinate sequences.

19. A non-transitory computer-readable storage medium storing computer instructions, wherein the computer instructions are configured for causing a computer to perform operations of:

acquiring a first video sequence, the first video sequence comprising a main sequence for describing a first posture of a human body and a subordinate sequence for describing a plurality of second postures of the human body;

extracting the main sequence and the subordinate sequence from the first video sequence; and in a case that it is detected that a sequencing identification frame exists in the first video sequence, performing random mixed sequencing processing on video frames in the main sequence and the subordinate sequence based on the sequencing identification frame and taking a sequence combination obtained by the random mixed sequencing processing as a second video sequence;

wherein the sequencing identification frame comprises at least one of a reverse frame, a jump frame, or a transition frame.

20. The non-transitory computer-readable storage medium of claim 19, wherein the computer instructions are configured for causing the computer to further perform an operation of:

adjusting a playing order of the video frames in the first video sequence based on the reverse frame, wherein the reverse frame comprises a further video frame other than a starting frame in the first video sequence.

\* \* \* \* \*